United States Patent [19]

Arnoldy

[11] 4,237,362
[45] Dec. 2, 1980

[54] METHOD OF PRODUCING HARDFACED PLATE

[75] Inventor: Roman F. Arnoldy, Houston, Tex.

[73] Assignee: Tapco International, Inc., Houston, Tex.

[21] Appl. No.: 946,677

[22] Filed: Sep. 28, 1978

[51] Int. Cl.³ .............................................. B23K 9/04
[52] U.S. Cl. ................................ 219/76.14; 219/76.1;
219/159; 29/527.2
[58] Field of Search .................. 219/73.21, 76.1, 76.11,
219/76.12, 76.13, 76.14, 76.15, 76.16, 76.17,
159, 73.11; 29/527.2

[56] References Cited

U.S. PATENT DOCUMENTS

| | | | |
|---|---|---|---|
| 3,046,936 | 7/1962 | Simons, Jr. ...................... | 219/76.1 X |
| 3,402,459 | 9/1968 | Arnoldy ............................. | 29/527.2 |
| 3,679,858 | 7/1972 | Bollinger ........................... | 219/76.11 |

*Primary Examiner*—B. A. Reynolds
*Assistant Examiner*—Keith E. George
*Attorney, Agent, or Firm*—Fulbright & Jaworski

[57] ABSTRACT

Disclosed are methods of producing hardfaced plate which eliminates distortion while making weld deposits along the length of a sheet-like plate of relatively ductile and weldable material by securing the plate about a cylindrical supporting surface, then welding hardfacing material to the plate's surface which causes the plate to shrink against and be supported by the cylindrical surface which effectively maintains the plate against substantial distortion during the welding. The plate with the welded hardfacing material is then removed from the cylindrical surface. Preferably, the composition of the hardfacing material is such as to form random cracks at a frequency of not less than about one in each three inches upon cooling from the welding temperature, and preferably of the order of about 5/8" to about ¾". Preferably, the cylindrical surface, which may be a portion of a drum, is rotated about a horizontal axis while welding one or more weld beads along the circumferential length of the plate and for ease of operation at the top of the plate's surface. The methods are particularly suited for making hardfaced plate in which the plate is not over ½" in thickness, for example, ¼" and 3/8" thickness plate.

13 Claims, 9 Drawing Figures

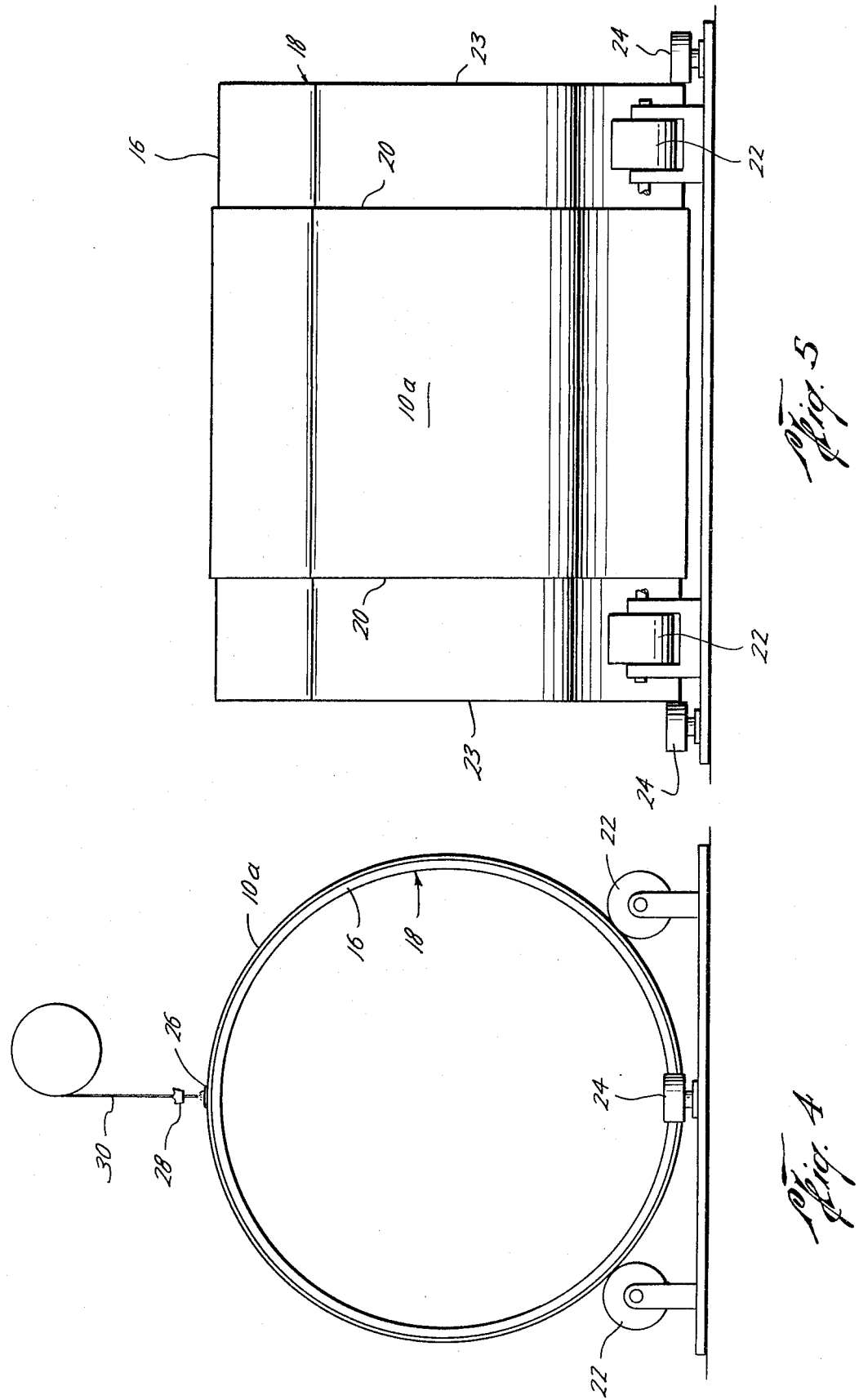

METHOD OF PRODUCING HARDFACED PLATE

BACKGROUND OF THE INVENTION

The conventional method of producing hardfaced plate, as described in my U.S. Pat. No. 3,494,749, with bulk welding as described in that Patent and my U.S. Pat. Nos. 3,076,888 and 3,060,307 has been to strap down a plate and try to hold it from distorting while making the weld deposits with one or two beads along the length of the plate. When the deposit is made on $\frac{1}{2}''$ or thicker plate, the plate remains reasonably flat and the deposit can be made in a reasonably uniform manner. However, the great majority of this hardfaced plate is used in the $\frac{1}{4}''$ and 3/8'' sizes since much of it is used in fan blades where weight is a major problem. When these thicknesses are clad in the flat position, the heat of welding combined with the shrinkage of the weld coating on cooling causes a buckling of the plate with undesirable effects that affect the quality of the deposit, and in most cases, the ability to clad the plate with more than one bead at a time.

When the plate buckles toward the weld nozzle, the distance from the weld zone on the plate to the welding nozzle is changed as illustrated in FIG. 1. The buckle is such that the distance of the welding wire (called "stickout") is decreased which calls for a greater amount of current in the weld operation to melt the welding wire since it must be heated from ambient to melting, while the wire is traveling a relatively short distance from the welding nozzle to the weld zone. This greater current will cause undesirable penetration into the plate and dilute the overlay with iron from the plate.

If the buckle is away from the nozzle as illustrated in FIG. 2, the welding operation requires less current because the longer distance which the welding wire travels from the welding nozzle to the work causes it to heat to melting with less rate of heat input because of the longer time of heating. This lower than normal current will result in insufficient melting of the base plate and loss of bond for the facing and will often cause incomplete melting of the granular hardfacing materials resulting in a "lean" alloy.

In addition, the buckling causes the plate to be unlevel and the deposit applied will tend to flow away from the weld zone and form a non-uniform, non-level overlay layer of too-heavy or too-light thickness.

The use of multiple welding heads serves to compound the problem and results in limiting the number of weld heads to one or two depending on the thickness of the plate to be clad. Also, in the cladding of thinner plate, such as $\frac{1}{4}''$, the plate heats through and tends to melt too easily in the weld zone giving unwanted dilution of the deposit with iron from the plate.

Additionally, the flat plate method gives a low percentage of total welding time in the cladding or hardfacing operation because after welding only one or two beads the length of the plate, the operation must be stopped, the weld bead or beads cleaned and the plate or the heads returned to the starting end and repositioned before the welding can again be started. The total time to clad a plate is thus increased by between 50 and 100%, depending on the efficiency of cleaning, returning to start, and repositioning the weld heads depositing the beads.

It would be highly advantageous to provide methods of overlaying or hardfacing plate which eliminate all of the foregoing difficulties.

SUMMARY OF THE INVENTION

The present invention is directed to methods of overlaying or hardfacing plate which eliminates all of the foregoing difficulties. More specifically, the present invention is directed to methods which eliminate the foregoing difficulties by the manner of holding and controlling the plate while being overlayed or hardfaced.

In short, the plate to be clad or hardfaced is secured about a cylindrical supporting surface, such as a drum, preferably the plate ends being welded together to form a cylinder and the cylindrical plate is slipped over the cylindrical surface of the drum. Hardfacing is then deposited on the plate surface, preferably on its upper surface as the drum and the plate are being rotated about a horizontal axis. As the welding progresses, the cylindrical plate being clad shrinks circumferentially and becomes tight against the cylindrical surface of the drum which maintains the plate in a rigid cylindrical shape and allows the welding "stickout" to be maintained at an accurate constant value. The drum also dissipates the welding heat and prevents a thin plate from being overheated and excessively melted to dilute the overlay alloy.

Any desired welding head can be utilized and, preferably, upon completion of 360 degrees of welding, the head or heads are moved automatically to start new weld beads continuous with the laid down weld beads so that the welding operation proceeds without stop until the entire cylinder is clad.

After the welding or cladding operation, and the plate has cooled, it is easily removed from the cylindrical surface of the drum, the ends are cut, and the plate is very easy to flatten from any residual cylindrical curvature left in the plate. The "reverse" curvature present in the cylinder form counters the dishing tendancy, that is the clad side tending to curve so as to be concave with the clad side up, and permits the finished product to be nearly flat when the cylinder is cut.

For many uses, the flattening operation can be eliminated as the product can be sold as commercially flat as produced; however, because of the residual tension in the cladding, the plate is very easy to flatten from any residual cylindrical curvature left in the plate as it comes off the cladding operation.

It is therefore an object of the present invention to provide methods of manufacturing hardfaced plate in which buckling of the plate while being hardfaced is virtually eliminated and a level plate is maintained and uniform deposit is applied.

A further object of the present invention is the provision of methods of making hardfaced plate in which the total time to clad or hardface a plate is decreased substantially from prior art methods.

A further object of the present invention is a method of making hardfaced plate in which buckling of the plate during welding and its attendant disadvantages are eliminated.

A further object of the present invention is the provisions of methods of producing hardfaced plate in which there is a good bond of the hardfacing with the plate, there is substantial uniform deposition of hardfacing to the plate, and in which the surface of the clad plate is substantially level and uniform when the cladding or hardfacing is completed.

A further object of the present invention is the provision of methods of producing hardfaced plate in which the foregoing disadvantages of prior methods are eliminated in an efficient and economical manner.

A further object of the present invention is the provision of methods of cladding or hardfacing plate in which formation of random cracking in desired frequency patterns is enhanced.

A further object of the present invention is the provision of methods of hardfacing plate in which the plate is secured about a cylindrical supporting surface which supports the plate and dissipates the heat of welding to minimize distortion of the plate and all its attendant disadvantages during the welding operation.

Other and further objects, features and advantages of the invention appear throughout the specification and claims.

BRIEF DESCRIPTION OF THE DRAWINGS

FIG. 4 is a side elevational view illustrating the cylindrically-formed plate of FIG. 4 disposed over the outer cylindrical surface of a drum.

FIG. 5 is a front view of FIG. 4.

DESCRIPTION OF THE PREFERRED EMBODIMENTS

Figure 3:
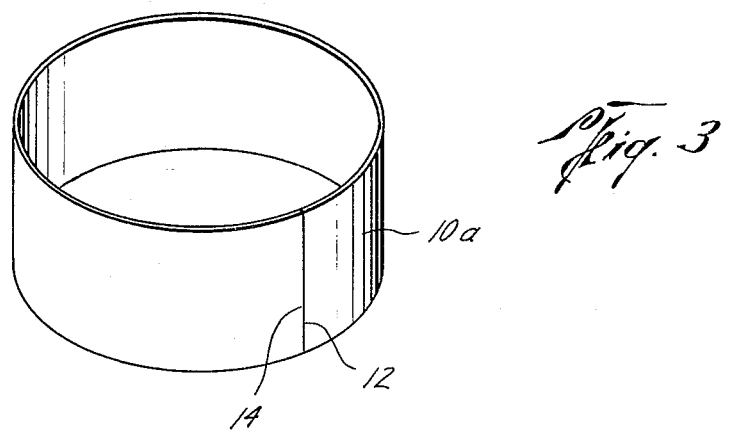
FIG. 3 is a perspective view illustrating plate to be clad or hardfaced formed in a cylinder with its opposed ends welded together.

Referring now to FIG. 3, a plate 10 to be clad or hard surfaced is formed into a cylinder 10a as shown by bringing the ends 12 and 14 opposite to one another and then welding them together. To reduce the curvature of the plate 10 in the cylinder, the length of the plate to be used is preferably above 20 feet, typically 30 or 40 feet for ease of handling. A 30-foot plate would result in a cylinder diameter of 9.55 feet.

As previously mentioned, the base plate 10 may be formed by any relatively ductile, malleable and weldable material, such as the mild steels and the like, and which may be cut, bent, and shaped, as desired. While any thickness of plate can be hardsurfaced according to the present invention, the methods of the present invention are particularly advantageous for use in plates having a thickness of ½" and under, for example in the ¼" and 3/8" thicknesses such as used for fan blades where weight is a major problem.

Referring now to FIGS. 4 and 5, the cylindrically-shaped plate 10a is slipped over the cylindrical supporting surface 16 of the drum 18, which drum 18 is formed of heavier plate typically ½" and above, for example ¾" thickness and which is constructed so as to be slightly smaller in diameter that that of the plate cylinder 10a to be clad. The cylindrical supporting surface 16 is constructed to extend axially beyond the sides 20 of the plate cylinder 10a to accommodate the power rollers 22 which are driven by any suitable source of power, not shown. The guide rolls 24 are provided so as to bear against each side 23 of the drum 18 to prevent the drum from walking as it turns on the rolls 22.

The power turning rolls 22 and guide rolls 24 may be of any desired type and shape, which are available upon the market, and, accordingly, no detailed description is deemed necessary or given.

The drum 18 may be formed of any suitable material which will withstand the conditions of use, such as steel, and which is strong enough to support the plate 10 in a relatively even cylindrical surface upon shrinkage against the cylindrical supporting surface 16 as welding of the overlay or hardfacing particles proceeds. Preferably, the material forming the cylindrical supporting surface should be able to conduct heat away from the cylindrical plate 10a.

As the drum 18 is being rotated, welding of the overlay of hardfacing particles is performed preferably by laying down a bead 26 at the upper surface and adjacent one side of the cylindrical plate 10a. This welding is accomplished by the welding head or nozzle 28 having a consumable wire electrode 30 extending therethrough and with the deposition of bulk welding particles to the cylindrical plate 10a. Any type of welding head can be used and the welding can be either open arc or submerged or shielded arc as desired. Suitable welding heads and methods which can be used for applying the welding bead and beads are those illustrated and described in my U.S. Pat. Nos. 3,076,888; 3,060,307; 3,172,991; 3,264,445; 3,260,834; 3,296,408; 3,513,287; 3,513,288; 3,513,283; 3,517,156; 3,609,292; 3,588,432; 3,735,087; 3,358,115. Any suitable method and apparatus for cladding or overlaying can be used.

Figure 6:
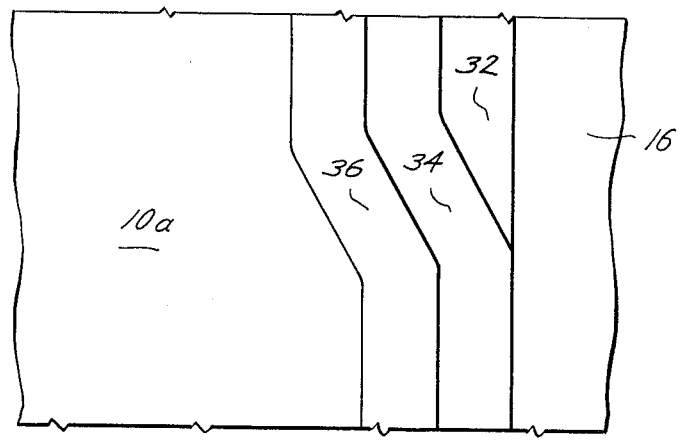
FIG. 6 illustrates the laying down of welding beads during the stepover operation.

The circumferential welding of the bead 26 on the outer surface of the cylindrical plate 10a is best illustrated in FIG. 6, to which reference is now made. This can either be a single bead 32 or two or more beads as desired. As the drum 18 is rotated, the bead 26 is welded circumferentially to the cylindrical plate surface 10a. On the completion of the first 360°, the welding head or heads 28 are moved axially across the cylinder to a position next to the laid down bead or beads 32 usually a distance of about 1 to ½" for one bead and a next bead 34 or beads laid down, then the welding head or heads 28 are moved again adjacent the just laid down bead 34 and the bead 36 or beads are then laid down. This continues until the desired amount of beads are laid down on the cylindrical plate 10a. The welding operator can thus proceed without stopping until the cylindrically-shaped plate 10a has its surface completely clad or hardfaced. As previously mentioned, as the welding progresses, the cylindrical plate 10a shrinks circumferentially and becomes tight against the cylindrical supporting surface 16 of the drum 18 which holds the plate in a rigid cylindrical shape and allows the welding stickout to be maintained at an accurate constant value. In addition, the contact with the cylindrical supporting surface 16 allows the welding heat to be dissipated and prevents a thin plate from being overheated and thus excessively melted which would dilute the overlay alloy with the metal of the base plate 10. It is unnecessary to lay down adjacent heads, but the heads can be spaced apart from one another and heads laid down in the spaces as desired.

The circumferentially-shaped plate 10 being overlaid is constantly in tension circumferentially. This provides two desirable effects. First, it prevents upward buckling of the plate which would shorten stickout (distance from nozzle to work) and cause non-uniform thickness and unevenness of deposit. Secondly, it encourages the formation of more frequent cracks which is the basis for the broad usefulness of the plate as a product, such as set forth in my U.S. Pat. No. 3,402,459.

Figure 7:
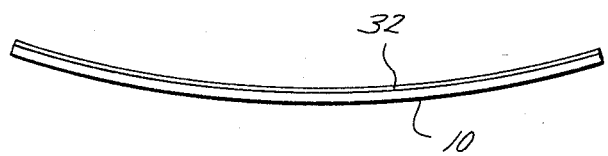
FIG. 7 is an end view of clad or hardfaced plate illustrating the shape of the plate clad without restraint according to prior art methods.
Figure 8:
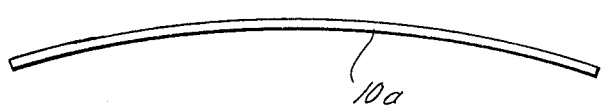
FIG. 8 is a view similar to that of FIG. 7 illustrating the shape of the plate on the cylinder before cladding.
Figure 9:
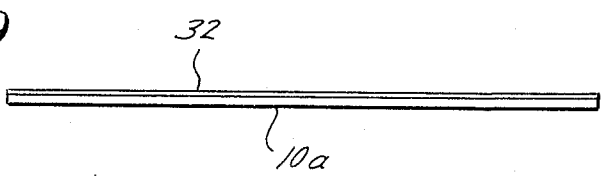
FIG. 9 is a view similar to that of FIGS. 7 and 8 illustrating the shape of the plate after cladding in cylindrical form and the ends being cut apart.

Because of the shrinkage present when the cladding cools from the molten to ambient the clad side 32 always tends to curve so as to be concave with the clad side up if the plate 10 is not restrained, such as illustrated in FIG. 7. The large diameter reverse curvature present in the cylinder form of the plate 10a, as illustrated in FIG. 8, counters this dishing tendency and allows the finished product to be nearly flat when the cylinder 10a is removed from the drum 18 and the ends 12 and 14 are cut, such as illustrated in FIG. 9. For many uses, this flattening operation is eliminated and the product can be sold as commercially flat as produced. Because of the residual tension in the cladding, the plate 10a is very easy to flatten from any residual cylindrical curvature left in the plate as it comes off the cladding operation and the ends 12 and 14 are cut.

The shrinkage of the cylindrically-shaped plate 10a in hardface overlaying or cladding occurs as follows: As overlaying or cladding begins the plate is heated by the overlay operation to an average temperature of approximately 400° F. while the overlay being deposited has a temperature of about 2300°F. The plate 10a being restrained from concaving on the overlay side, in cooling from 400° F. to ambient tries to shrink back to its original size. Meanwhile, the overlay is cooling from about 2300° F. to ambient so it tries to shrink or contract more than the metal plate 10a because it is cooling from about 2300° F. while the plate 10a is only cooling from about 330° F. When restrained, the harder, more brittle overlay cracks to relieve the stresses of this shrinking, however, not all of the stress is removed by these cracks, so the plate 10a comes under compression in an amount equal to the tension stress left in the facing which compresses it from its original length to some length slightly less than the original length depending on how much tension stress is left in the facing, which is a function of how many cracks have been formed. If the strip were not restrained, the strip will concave on top since it is not restrained, there will be fewer cracks and the plate 10a will not contract as much in length.

Figure 1:
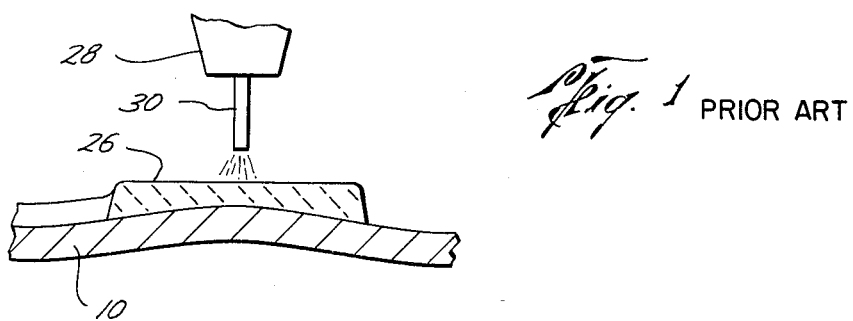
FIG. 1 is a fragmentary side view illustrating buckling up effects of prior art plate cladding or hardfacing methods.
Figure 2:
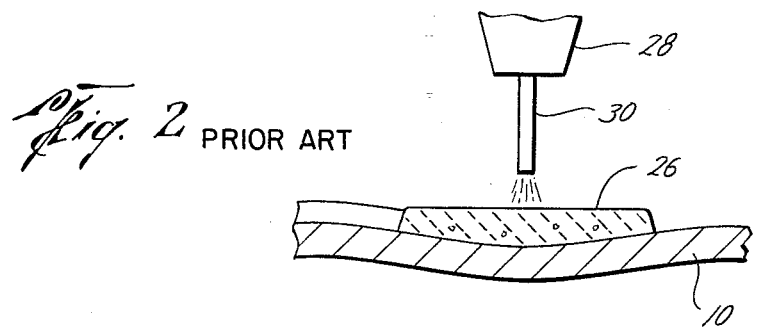
FIG. 2 is a view similar to that of FIG. 1 illustrating buckling down effects of prior art plate cladding or hardfacing methods.

The effect of buckling of unrestrained plate is best illustrated in FIGS. 1 and 2 to which reference is now made. When the plate 10 buckles upwardly as illustrated in FIG. 1, the distance from the weld zone on the plate to the contact nozzle 28 is changed (called stickout). The distance the consumable wire electrode 30 travels to the plate 10 is decreased which results in a great amount of current being called for in the weld operation to melt the consumable wire electrode since it must be heated from ambient to melting, while the wire electrode 30 is traveling the shorter distance from the contact nozzle 28 to the weld zone. This greater current causes undesirable penetration into the plate 10 and a resultant dilution of the overlay 26 with the iron or metal of the base plate 10.

If the buckle is away from the nozzle as illustrated in FIG. 2 this causes the consumable wire electrode 30 to travel a greater distance or have a greater stickout from the nozzle 28 to the work or base plate 10 causing the wire electrode 30 to heat to melting with less rate of heat input because of the longer time of heating. This lower than normal current required results in insufficient melting of the base plate 10 and the loss of bond for the facing and often causes incomplete melting of the granular material resulting in a "lean" alloy.

In addition, the buckling causes the plate 10 to be unlevel and the deposit applied would tend to flow away from the weld zone and form a non-uniform, non-level overlay layer of too-heavy or too-light thickness.

As previously mentioned, this buckling and all the attendant disadvantages are eliminated by the present methods of overlaying or cladding plate and particularly plates of a thickness of up to ½" in thickness which tend to buckle more than thicker plates.

Accordingly, the present invention is well-suited and adapted to attain the objects and ends and has the advantages and features mentioned, as well as others inherent therein.

While presently preferred embodiments of the present invention have been given for the purpose of disclosure, changes may be made therein which are within the spirit of the invention as defined by the scope of the appended claims.

What is claimed is:
1. A method of producing hardfaced plate comprising,
   disposing a sheet-like plate of relatively ductile and weldable material and having a thickness of up to about ½" about a cylindrical supporting surface,
   then welding hardfacing material to the plate's surface, the distance between the plate and the cylindrical supporting surface being such that upon the welding of the hardfacing material to the plate surface, the plate is supported by the cylindrical supporting surface in a rigid cylindrical shape thereby avoiding sustantial distortion of the plate during the welding and maintaining stickout at a substantially constant distance, the supporting surface dissipating welding heat effective to prevent the plate from being overheated and excessively melted to dilute the hardfacing material, and
   removing the plate from the cylindrical supporting surface after the welding of the hardfacing material to the plate's surface.
2. The method of claim 1 where,
   the composition of the hardfacing material is such as to form cracks at a frequency of not less than about one in each three inches upon cooling from the welding temperature.
3. The method of claim 1 where,
   the composition of the hardfacing material is such as to form cracks in a frequency range of the order of about 5/8" to about ¾".
4. The method of claim 1 including,
   rotating the cylindrical supporting surface about a horizontal axis while welding the hardfacing material to the plate's surface.
5. The method of claim 4, where,
   the welding is by depositing welding beads generally circumferentially on the plate's surface.
6. The method of claim 4 where, the welding of the hardfacing material is at the top of the plate's surface.

7. The method of claim 4 where,
the plate-like sheet is disposed about the cylindrical supporting surface by forming a cylinder of the plate of larger diameter than the cylindrical surface and welding the opposed ends of the plate together, and
then placing the cylindrical sheet-like plate about the cylindrical supporting surface.

8. A method of producing hardfaced plate comprising, disposing a sheet-like plate of relatively ductile and weldable material and having a thickness of up to about ¼" about a cylindrical supporting surface,
rotating the cylindrical supporting surface about a horizontal axis while welding hardfacing material to the plate's surface,
the sheet-like plate shrinking circumferentially and becoming tight against the cylindrical surface as welded areas cool and the welding progresses to additional areas thereby maintaining the plate in a rigid cylindrical shape thereby maintaining the welding stickout at an accurate constant value,
the cylindrical supporting surface dissipating welding heat and preventing the plate from being overheated and excessively melted to dilute the overlay alloy, and
removing the plate from the cylindrical supporting surface after the welding of the hardfacing material to the plate's surface.

9. The method of claim 8 where,
the composition of the hardfacing material is such as to form cracks at a frequency of not less than about one in three inches upon cooling from the welding temperature.

10. The method of claim 8 where,
the composition of the hardfacing material is such as to form cracks in a frequency range in the order of about 5/8" to about ¾".

11. The method of claim 8 where,
the plate-like sheet is disposed about the cylindrical supporting surface by forming a cylinder of the plate of larger diameter than the cylindrical surface and welding the opposed ends of the plate together, and
then placing the cylindrical sheet-like plate about the cylindrical supporting surface.

12. The method of claim 8 including,
rotating the cylindrical supporting surface about a horizontal axis while the welding is by depositing welding beads generally circumferentially on the plate's surface.

13. The method of claim 12 where,
the welding of the hardfacing material is at the top of the plate's surface.

* * * * *

UNITED STATES PATENT OFFICE
CERTIFICATE OF CORRECTION

Patent No. 4,237,362             Dated December 2, 1980

Inventor(s) Roman F. Arnoldy

It is certified that error appears in the above-identified patent and that said Letters Patent are hereby corrected as shown below:

Column 3, Line 48, change "3" to -- 4 --.

Signed and Sealed this

Twenty-first Day of April 1981

[SEAL]

Attest:

RENE D. TEGTMEYER

Attesting Officer     Acting Commissioner of Patents and Trademarks

UNITED STATES PATENT OFFICE
CERTIFICATE OF CORRECTION

Patent No. 4,237,362                     Dated December 2, 1980

Inventor(s)    Roman Francis Arnoldy

It is certified that error appears in the above-identified patent and that said Letters Patent are hereby corrected as shown below:

On the title page, cancel Item [73].

Signed and Sealed this

Sixteenth Day of June 1981

[SEAL]

*Attest:*

RENE D. TEGTMEYER

*Attesting Officer*     *Acting Commissioner of Patents and Trademarks*